(No Model.) 3 Sheets—Sheet 1.

J. A. CROCKER.
FILTERING MACHINE.

No. 358,108. Patented Feb. 22, 1887.

WITNESSES.
Daniel C. Bates,
Luther B. Hoyt.

INVENTOR.
James A. Crocker,
pr Norman W. Stearns.
Attorney (No Model.) 3 Sheets—Sheet 2.

J. A. CROCKER.
FILTERING MACHINE.

No. 358,108. Patented Feb. 22, 1887.

WITNESSES.
Daniel C. Bates,
Luther B. Hoyt.

INVENTOR.
James A. Crocker,
pr. Norman W. Stearns
Attorney.

(No Model.)　　　　　J. A. CROCKER.　　3 Sheets—Sheet 3.
FILTERING MACHINE.
No. 358,108.　　　　　　　Patented Feb. 22, 1887.
Fig. 4.
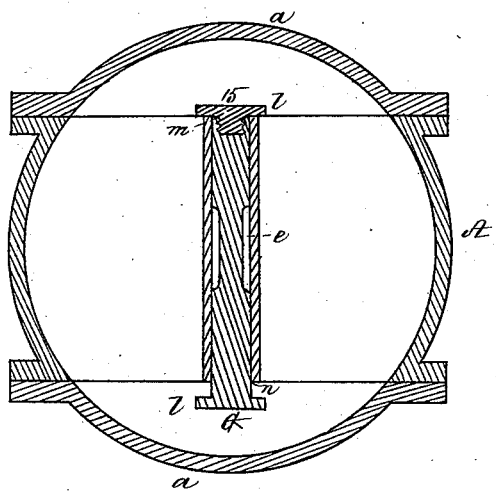
Fig. 9.　　Fig. 10.　　Fig. 11.
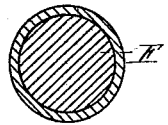 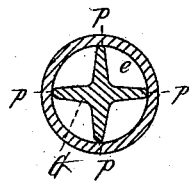 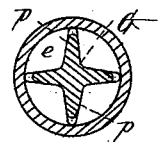
WITNESSES.　　　　　　　　　INVENTOR.
Daniel C. Bates,　　　　　　James A. Crocker,
Luther B. Hoyt.　　　　　　pr Norman W. Stearns
　　　　　　　　　　　　　　　　Attorney.

UNITED STATES PATENT OFFICE.

JAMES ALLEN CROCKER, OF BOSTON, MASSACHUSETTS, ASSIGNOR TO THE CROCKER FILTERING COMPANY.

FILTERING-MACHINE.

SPECIFICATION forming part of Letters Patent No. 358,108, dated February 22, 1887.

Application filed July 3, 1886. Serial No. 207,057. (No model.)

*To all whom it may concern:*

Be it known that I, JAMES ALLEN CROCKER, of Boston, in the county of Suffolk and State of Massachusetts, have invented certain Improvements in Filtering-Machines, of which the following is a full, clear, and exact description, reference being had to the accompanying drawings, making part of this specification, in which—

Figure 1:
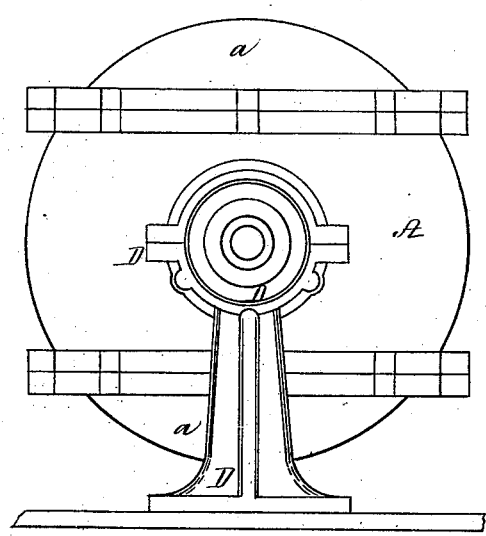
Figure 3:
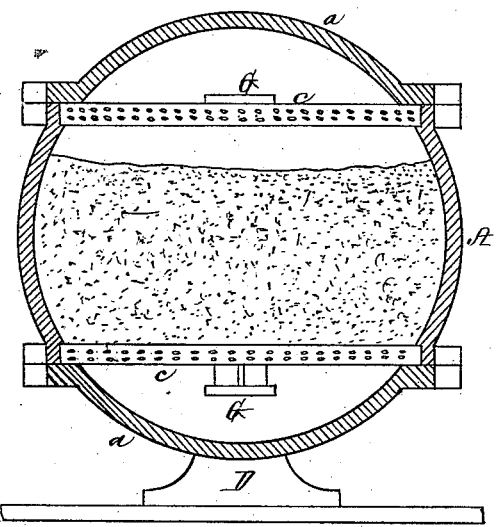
Figure 7:
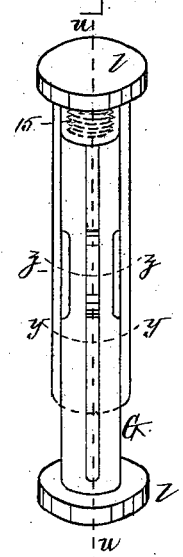
Figure 6:
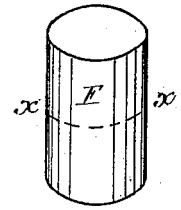
Figure 8:
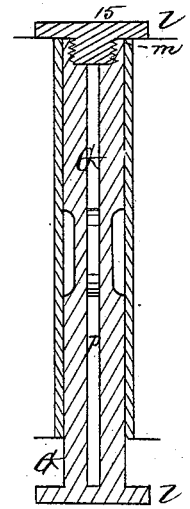
Figure 2:
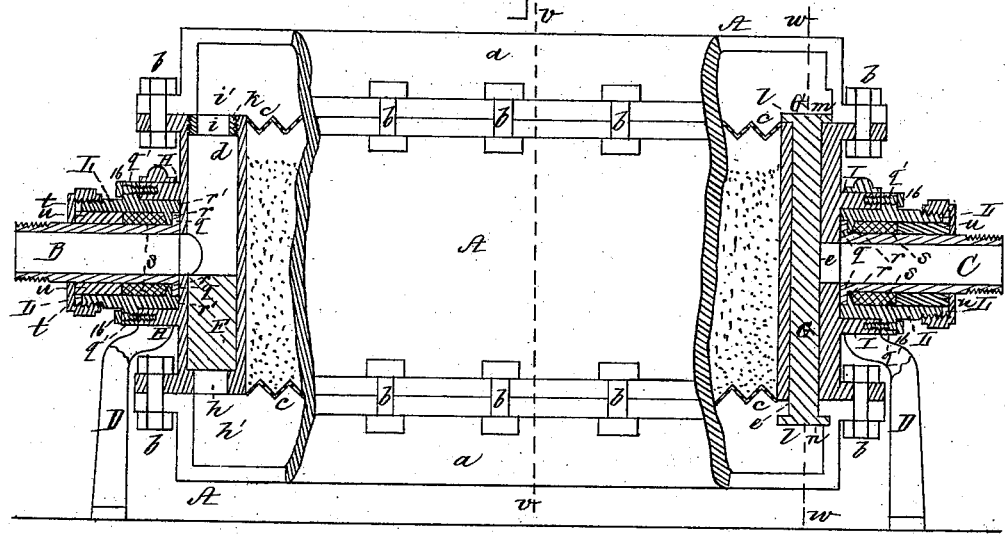
Figure 5:
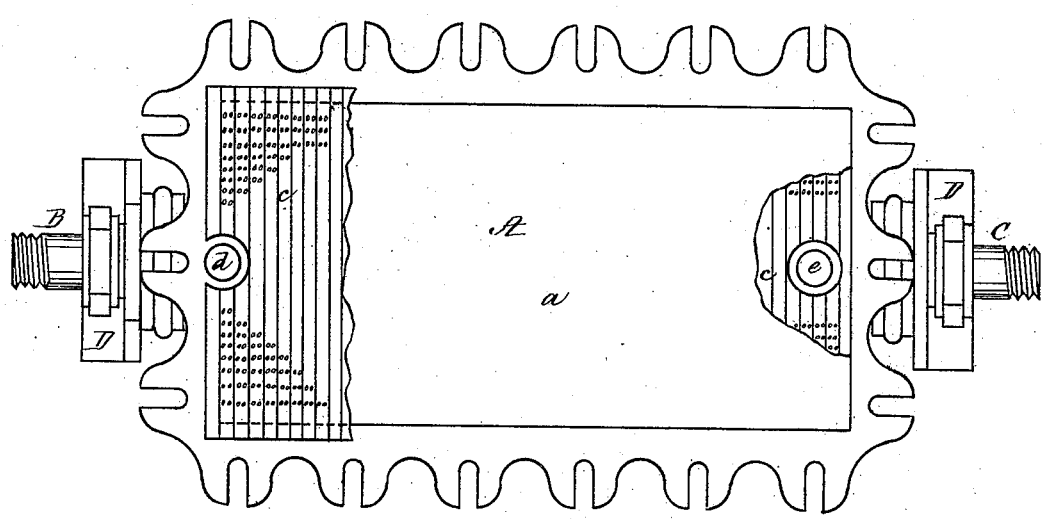

Figure 1 is an end elevation of a revolving filtering-machine constructed in accordance with my invention. Fig. 2 is a longitudinal vertical section through the center of the same. Fig. 3 is a transverse section on the line $v\ v$ of Fig. 2. Fig. 4 is a transverse section on the line $w\ w$ of Fig. 2. Fig. 5 is a plan of the filtering-machine with its upper cover and a portion of its upper strainer removed. Fig. 6 is an enlarged perspective view representing the automatically-sliding valve for controlling the water-passage in one end of the filter-casing. Fig. 7 is an enlarged view of the automatically-sliding valve for controlling the water-passage in the opposite end of the casing; Fig. 8, a vertical section on the line $u\ u$ of Fig. 7; Fig. 9, a transverse section on the line $x\ x$, through the valve shown in Fig. 6, with the water-passage in which said valve is located; Fig. 10, a transverse section on the line $y\ y$, through the valve shown in Fig. 7, with the water-passage in which it is located; Fig. 11, a transverse section on the line of $z\ z$ Fig. 7 enlarged.

My present invention has special reference to that class of rotating filters for manufacturing purposes described in United States Patents Nos. 279,226 and 305,574, granted to me and also described in pending applications for United States Patents filed by me April 16, 1886, in which a horizontally-rotating filtering-machine having a single independent shell or casing is employed, having at each end a water-passage and a hollow stationary journal communicating therewith, the distinguishing and perhaps the most prominent feature of this invention being a pair of automatically-sliding valves moving by gravity within and for closing said passages, the inlet and outlet ports of which are made to alternately register with the fixed supply and discharge journals, as the position of the casing and valves are changed by revolving the casing according as the water is to be filtered or the bed of filtering material is to be cleansed from the sediment deposited thereon and therein.

In the said drawings, A represents a single shell or casing adapted to rotate on fixed hollow journals B C within suitable bearings, D D, and having its upper and lower sides provided with covers $a$, secured thereto by bolts $b$, a corrugated strainer, $c$, of wire-gauze or perforated metal being interposed between each cover and the contiguous portion of the casing, the form of the filtering-machine, when the covers are in place being cylindrical, or nearly so. (See Figs. 1, 3, and 4.)

$d\ e$ are vertical water-passages formed in the opposite ends of the casing, that $d$ in the left or inlet end of the casing being of uniform cylindrical form except at its top and bottom, (see Fig. 2,) where its diameter is contracted, forming a port or opening, $h$, at its bottom, communicating with the space $h'$ between the under cover, $a$, and the contiguous strainer $c$, and forming a port, $i$, at its top, communicating with the space $i'$ between the upper strainer, $c$, and its contiguous cover $a$ thereover, while the water-passage $e$ in the right or outlet end of the casing is of cylindrical form of the same diameter from top to bottom.

Within the water-passage $d$ is located a cylindrical plug or valve, F, preferably solid, which fits snugly therein and rests on the seat of the port $h$ when the filter-casing is in the position seen in Fig. 2, and upon the seat of the port $i$ when the casing is rotated one hundred and eighty degrees from said position, the said cylindrical valve F automatically falling by gravity through the water-passage $d$ from the seat of one port to that of the other, and forming a water-tight joint with both seats, so as to alternately open one port and close the other in said water-passage, according to the positions of the casing, from that shown in Fig. 2 to that (not shown) after being given a half-revolution. This cylindrical valve F is introduced within said passage $d$ from its top, and a screw-thimble, $k$, (with the port $i$ at its center,) is turned into the sides of the passage $d$ at its end.

Within the water-passage e is located a long valve, G, its length exceeding that of the passage, each end of the valve G terminating in an annular projection, l, of a diameter greater than that of the passage e, in which it is also free to move by gravity when the casing is given a semi-revolution, the inner surfaces of the two projections l l being carefully turned down, so as to alternately close the ports or ends m n of the passage e. The stem or portion of the valve G intermediate of the projections l l will now be described by reference to Figs. 7, 8, 10, and 11. The form of the stem in transverse section is that of four ribs, p, one being arranged diametrically opposite another, Fig. 10, the distance between the extremities of each pair being equal to the diameter of the water-passage e, a space between any two contiguous ribs and the interior of the water-passage being thereby afforded for the water to flow freely up therein, each rib p being cut away for a short distance above and below a horizontal line passing through the axis of the hollow journal C contiguous thereto, by which construction the water-way of the passage e is enlarged to permit of the unobstructed escape of the water to said outlet-journal, the water entering the casing by the hollow journal B at the left and passing through the filtering material out by the hollow journal C at the right, Fig. 2.

As previously stated, the length of the valve G exceeds that of its water-passage e, Fig. 2, the upper end or projection l resting on and making a tight joint with the upper seat, and the lower projection l extending below the bottom of the water-passage e, by which arrangement the water is permitted to pass up the space between the ribs p and the inner wall of said passage to the enlarged space opposite the hollow journal C and escaping through the same, the hollow journal B constituting a fixed supply-pipe and the hollow journal C a fixed discharge-pipe, and the inlet and outlet ports i m h n of the water-passages d e of the casing alternately registering with said fixed supply and discharge journals as the position of the casing is changed by revolving it one hundred and eighty degrees.

In order to admit of the introduction of the valve G within its water passage e, the inner end of one of the projections l terminates in a screw-plug, 15, which turns into the contiguous ribbed portion of the stem, the parts being separated when the valve is to be located in position and afterward screwed together.

The filtering material may consist of animal or vegetable carbon, granulated silica, pumice-stone, gravel, &c., and may occupy the whole area or a portion of the area within the casing between the strainers c c, and is introduced by removing one of the covers and the strainer in proximity to it.

It will be observed that the journals B C are open from end to end, and have no other ports or openings, the inner end of each journal communicating directly and being at right angles with the contiguous water-passage of the casing, the top of the valve F being always flush or on a line with or slightly below the bottom of the interior of the journal B, and the entire area in transverse section of the inner end of the journal C being always open and leading directly from the enlarged water-space around the ribs p to insure the unobstructed passage of water at all times, as previously described.

When the filtering material requires cleansing, it is effectually performed by turning the casing one hundred and eighty degrees, in which position the sediment which had before collected chiefly at the bottom of the filtering bed is located at or near the top of the bed.

The centers of the casing terminate in hollow hubs H I, and the hollow journals B C pass into them, each journal having its inner end provided with an annular flange, q, which abuts against the outside of the casing, (that portion of it forming the hub.) To pack the joint between each hub and its contiguous journal, I interpose a sleeve L, and a packing, s, between them, (see Fig. 2,) the inner end of the sleeve having an annular flange, r, and the outer end of the sleeve being provided with an exterior screw-thread for the reception of a nut, t, which when turned inward thereover forces a metallic ring or collar u tightly against the annular packing s, (the position of the inner end, r', of the sleeve L being against the hub or casing,) and thus precludes any possibility of leakage at this point. To keep each journal on its seat against the outside of the casing, and the flange r of the sleeve L and packing s up to the journal-flange q, I employ screws or screw-bolts 16, which pass through an outer flange, q', of the sleeve L into the hub.

I claim—

1. As an improvement in rotating filtering-machines having a single shell or casing supplied with filtering material, the automatic inlet and outlet valves F G, actuated by gravity, in combination with and for alternately opening and closing the ports h i m n, of the inlet and outlet water-passages d e, substantially as described.

2. A rotating filtering-machine consisting, essentially, of the following-named elements, viz: a single independent shell or casing, A, containing filtering material, water-passages d e at opposite ends of the casing, a pair of ports for each water-passage, gravitating valves F and G, for alternately opening and closing said ports, stationary hollow journals B C, which constitute fixed supply and discharge pipes, and bearings D D for said journals, the several parts being constructed to operate substantially as described.

Witness my hand this 22d day of June, 1886.

JAMES ALLEN CROCKER.

In presence of—
 N. W. STEARNS,
 JAS. W. CHAPMAN.